Oct. 24, 1967  F. P. CLARK ET AL  3,348,936
AUTOMATIC MOLTEN GLASS LEVEL CONTROL APPARATUS
Filed Aug. 29, 1963
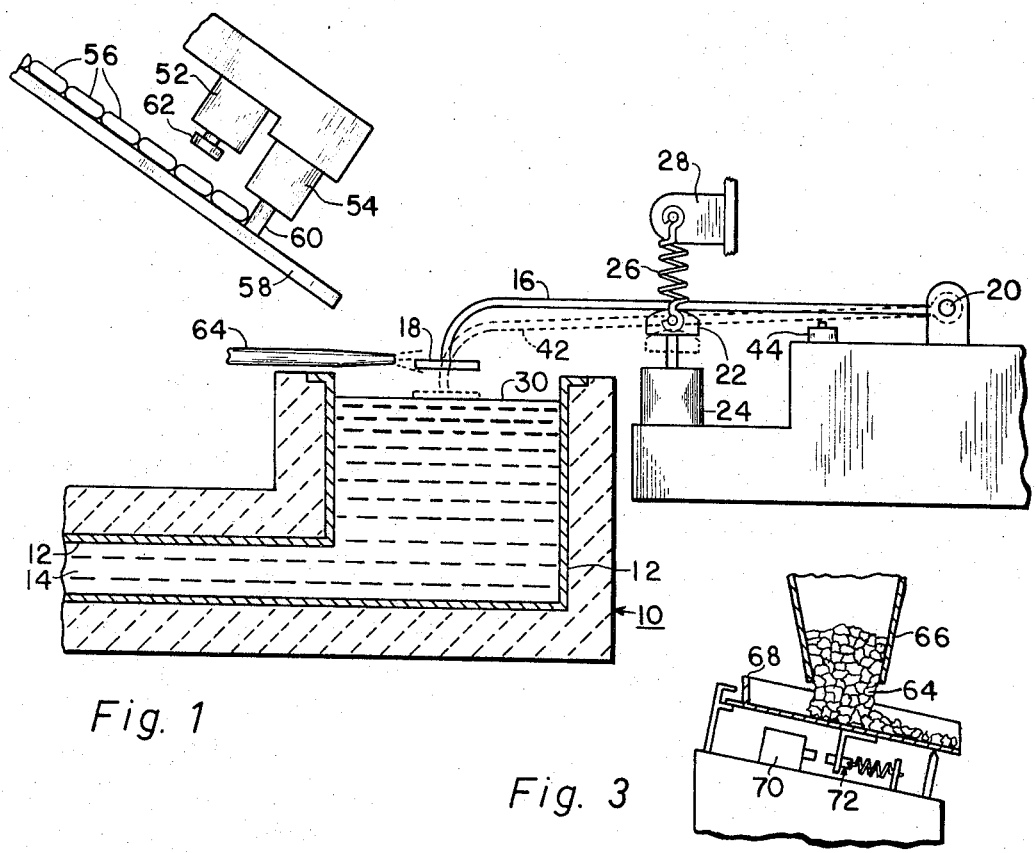
Fig. 1
Fig. 3
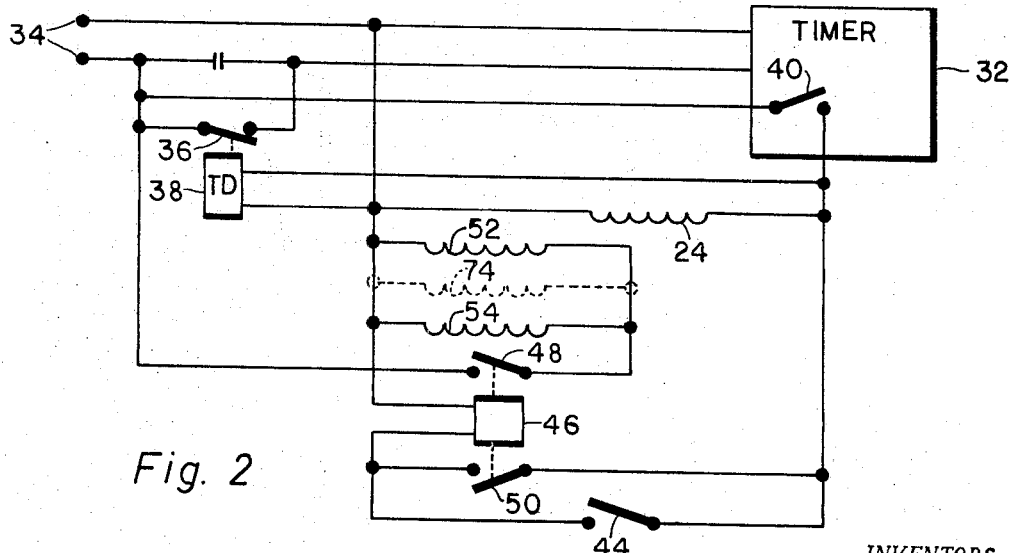
Fig. 2
INVENTORS.
Forest P. Clark
Robert T. Gladwell Jr.
BY Walter S. Zebrowski
ATTORNEY

United States Patent Office 3,348,936
Patented Oct. 24, 1967

3,348,936
AUTOMATIC MOLTEN GLASS LEVEL
CONTROL APPARATUS
Forest P. Clark and Robert T. Gladwell, Jr., Raleigh, N.C., assignors to Corning Glass Works, Corning, N.Y., a corporation of New York
Filed Aug. 29, 1963, Ser. No. 305,310
10 Claims. (Cl. 65—160)

This invention relates to an apparatus for liquid level control and more particularly to a device and method for measuring, controlling, and maintaining the glass level in a glass melting furnace, but is no way limited to such applications.

The apparatus and method of the instant invention are particularly suitable for controlling glass level in comparatively small glass melting furnaces.

As is well known in the manufacture of glass ribbon, cane, or the like, the maintenance of an exacting level of liquid material within a furnace, tank, or container, is extremely important in many manufacturing operations, both for maintenance of operating stability of the processing equipment involved, and often more importantly, for maintenance of quality in the products produced. The manufacture of glass ribbon for use as a dielectric within electrical capacitors is one manufacturing process requiring such control, and is one of the processes to which the present invention is particularly adaptable. By way of example, the manufacture of continuous glass ribbon involves the withdrawal of molten glass from a furnace, tank, or container while the molten material is maintained at a constant temperature. The orifice of a feeder associated with such a furnace, tank, or container of molten glass, is usually located on the underside thereof and is subjected to the head of molten material thereabove. Upon withdrawal of material from the orifice, the head of material is an important factor in determining the size and thickness of the glass ribbon being produced. The maintenance of a constant level or constant head of material above the orifice therefor plays an important part in the determination of the uniformity of size and thickness of the glass ribbon produced. In view of the ever-increasing demand for such glass ribbon, and its wide range of use for industrial purposes, the tolerances, or tolerable range of variation of size and thickness for general use has been constantly narrowed to present day strict requirements. To establish such production on a constant basis, it is necessary, in addition to the exercise of exacting temperature and viscosity control, that the head of the liquid be also exactingly controlled to practically negligible variations in level. To illustrate the problems connected with obtaining such control, non-automatic or manual means for checking of the glass level, for example, involve continual re-adjustment of raw material feeding rates by the glass tank operator and call for the exercise of considerable judgment. Years of experience are accordingly required on the part of an operator before his judgment approaches reliability and, even after developing a definite skill, this method is still costly and subject to the human element.

In the past, various types of apparatus and devices have been used for controlling the glass level in furnaces. One such apparatus comprised a platinum electrode which was caused to be removed against the surface of the molten mass in such a way, that it was alternately dipped into, and raised out of, the molten mass at predetermined periodic intervals. The dipping electrode closed a circuit that terminated the movement of the electrode and simultaneously recorded the final position of the electrode. Due to their intricate structure, such devices were susceptible to trouble and often broke down in practical operation. Moreover, the formation of a glass drop sticking to the electrode was frequently the cause of inaccurate measurement and control of glass level.

In another prior art arrangement the level was regulated by means of a member placed in continuous contact with the glass, however, this member was always subject to more or less pronounced wear, whereby very appreciable measurement errors were caused when the member has been in use for some time.

Optical devices (level gauges) are also known, but these devices are not suitable either for recording of the readings or for regulating the means for charging glass furnaces.

In another well known prior art glass level controller, a nozzle blows air against the glass surface. The kinetic pressure thus exerted represents a measure of the height of the glass level. However, a part of the glass may be retained in this nozzle after accidental dipping of the nozzle into the liquid glass mass, so that the cross section thereof is narrowed to such an extent that considerable mistakes are made in measuring the glass level.

It is an object of the present invention to provide an economic apparatus and method for controlling the level of materials in molten form within a container which will overcome the heretofore noted disadvantages and difficulties.

Another object of this invention is to provide means for sensing the level of molten material within a container and automatically causing batch material to be fed to compensate for variations in the level of the molten material.

It is still another object of this invention to provide a molten material level control adaptable to the detection and maintenance of the level within a small preselected range.

It is a further object to eliminate the human element from sensing and maintaining a desired level of molten glass within a melting furnace or other container.

A still further object is to provide an automatic molten glass level control apparatus which will work reliably and efficiently and with the minimum of attention after it once has been installed and preset or adjusted for the operation intended.

It is another object to provide a level detection and control means capable of withstanding high temperatures to permit its use in the maintenance of levels of molten material.

Still another object is to provide a means and method for gauging the level of molten glass which does not require the need for using precious metals.

Broadly, according to the present invention, the apparatus for controlling the level of molten material within a container comprises a pivotally mounted level sensing member, first means for supporting said member above the surface of said molten material, second means for causing said member to contact said surface of molten material at periodic intervals in accordance with a predetermined schedule, raw material feeding means, third means operatively associated with said member and responsive to the position thereof for providing the source of electrical energy to said raw material feeding means when the level of said molten material is below a predetermined value whereby raw material is fed to said container to raise the level to substantially said predetermined value, and means for maintaining the temperature of the molten material contacting portion of said member substantially below that of the molten material.

Additional objects, features, and advantages of the present invention will become apparent to those skilled in the art from the following detailed description and the attached drawings on which, by way of example, only the preferred embodiments of this invention are illustrated.

FIGURE 1 is a cross sectional elevation of the apparatus of this invention.

FIGURE 2 is a schematic drawing illustrating the electrical control circuit of this invention.

FIGURE 3 is a cross sectional elevation of another embodiment of batch feeding means.

FIGURE 1 illustrates a temperature controlled container, such as furnace 10, the inner surface of which is protected by a suitable liner 12, within which furnace a body 14 of molten material is disposed. Member 16, having molten material contacting plate 18 fixed to one end thereof, is mounted for pivotal movement about pin 20 at the other end thereof. Member 16 is supported intermediate its ends by solenoid piston head 22 of solenoid 24. When solenoid 24 is de-energized as hereinafter described, spring 26, fixedly mounted at one end to support 28 and at the other end to head 22, causes member 16 to rest against said head 22 in such a position that contacting plate 18 is maintained substantially above the level of surface 30 of molten body 14.

Referring additionally to FIGURE 2, it is seen that the timing portion of timer 32 is supplied electrical energy through input terminals 34 and relay contacts 36 of time delay relay 38.

Time delay relay 38 may be of the thermal or the like type which can be readily selected by one familiar with the art. Timer 32 is preset to measure a predetermined period of time by means not shown and well known in the art. The type of timing device used, such as a timer-motor or the like, is not critical as long as it is capable of measuring predetermined and preset intervals of time and is automatically resettable at the expiration of such intervals. At the completion of this predetermined period of time, contacts 40 of timer 32 are caused to close. When contacts 40 are closed, solenoid 24 is energized causing head 22 to be retracted whereby member 16 pivots about pin 20 to the position indicated by dotted lines 42. Rotation of member 16 is stopped in one of two ways, depending on the level of molten body 14. If said level is within a predetermined and preset range, contacting plate 18 will contact surface 30 and prevent further rotation, however, if said level is at or below the lower value of said preset range, member 16 will contact switch 44 thereby closing it and causing relay 46 to become energized. When relay 46 is energized, normally open relay contacts 48 and 50 are closed to maintain relay 46 energized and to energize solenoids 52 and 54. Solenoids 52 and 54 comprise the escapement mechanism of the batch feeding means. Batch, in the form of blocks or pillows 56, is loaded on an inclined chute 58 and comes to rest against the normally extended piston 60 of solenoid 54, and passes under normally retracted piston 62 of solenoid 52. When relay 46 is energized, in turn energizing solenoids 52 and 54, piston 62 of solenoid 52 is extended to come to rest against one of said pillows 56 preventing the balance of said pillows from moving forward, and piston 60 of solenoid 54 is retracted to allow the pillows or blocks between piston 62 and piston 60 to be fed to molten body 14. By careful spacing of pistons 60 and 62 and suitably selecting the size of pillows 56 in relation to the volume of body 14, the amount of batch fed to said body can be accurately regulated to maintain the level thereof within exacting limits.

In addition, as timer contacts 40 close, time delay relay 38 is energized. The normally-closed contacts 36 of time delay relay 38 remain closed throughout the duration of the delay period, allowing sufficient time to sense the level of molten body 14 and to add batch material to said body. As the delay time of relay 38 expires, its contacts 36 open, thereby de-energizing timer 32, the contacts 40 of which then open. As timer contacts 40 are opened, solenoid 24 is de-energized causing spring 26 to raise member 16 so that plate 18 is spaced from surface 30. Also as timer contacts 40 are opened, relay 46 and in turn solenoids 52 and 54 are de-energized whereby piston 60 returns to its normally extended position and piston 62 returns to its normally retracted position allowing pillows 56 to slide down chute 58 and come to rest against said piston 60 thereby placing a controlled amount of batch in position to be fed to body 14 during the succeeding feeding cycle. Additionally, as timer contacts 40 are opened, time delay relay 38 is de-energized. The nature of relay 38 is such that its contacts 36 remain open for a short period of time sufficient for timer 32 to reset, which it does automatically upon de-energization. Contacts 36 of relay 38 then close, causing timer 32 to run for another preset period of time.

It is therefore seen that when the level of body 14 is above a preset value, plate 18 will come to rest on surface 30 without engaging switch 44, however, if the level is below said preset value, switch 44 will be engaged by member 16 before plate 18 thereof contacts surface 30, causing additional batch material to be added to said body.

To prevent plate 18 from becoming wetted by the material of body 14, when it contacts surface 30 thereof, said plate is maintained at a temperature below that of body 14 by a jet of air supplied by tube 64. Since plate 18 only makes periodic and momentary contact with the hot body 14, and is maintained at a temperature substantially below that of said body, it may be made of material such as stainless steel having a high chromium and nickel content rather than of precious metal as used for the heretofore noted prior art sensors and electrodes.

Although the batch feeding means have been described as comprising a chute and an escapement device, it is readily seen to those familiar with the art that other feeding means having adequate accuracy, and responsive to an electrical signal, such as a vibrating hopper or the like, may also be used. Referring now to FIGURE 3, such a vibrating hopper assembly is illustrated wherein batch material 64 is contained within a hopper 66 from which it empties onto chute 68. Vibrator 70 causes chute 68 to vibrate through and in conjunction with spring mechanism 72 in a manner well know in the art. By proper arrangement of the vibrating mechanism and the chute, and careful selection of the batch particle size, the amount of batch fed to the molten body can be accurately regulated to maintain the level thereof within exacting limits. When a vibratory hopper would be employed as batch feeding means, coil 74 of vibrator 70 would be connected within the electrical circuit replacing solenoids 52 and 54 as illustrated in phantom in FIGURE 2. That is, when an escapement mechanism is employed solenoids 52 and 54 thereof are connected as shown, however, when a vibratory feeder is employed solenoids 52 and 54 are removed and replaced by vibrator coil 74.

A typical example of carrying out the present invention is illustrated by the following. An apparatus such as is illustrated in FIGURES 1 and 2 is provided. Glass pillows, having a size of approximately 2" x 1" x ¼" were loaded upon chute 58. Timer 32 was set for 5 minutes.

Thermal type time delay relay 38 and a delay time of 2 seconds. Contacting plate 18, formed of ASME type 309 stainless steel, was maintained about 2 inches above the desired level of surface 30. It was found that under these conditions the glass level within glass furnace 10 was maintained within plus or minus 1/16 inch.

Although the present invention has been described with respect to specific details of certain embodiments thereof, it is not intended that such details be limitations upon the scope of the invention except insofar as set forth in the following claims.

We claim:

1. An apparatus for controlling the level of molten glass in a container comprising
   (a) a pivotally mounted float type level sensing member,
   (b) means for supporting the level sensing portion of said member above the surface of said molten glass,
   (c) means for causing said sensing portion to lower toward said surface of molten glass at periodic intervals in accordance with a predetermined schedule,
   (d) glass batch feeding means embodying a first solenoid having a piston in a normally extended position and a second solenoid having a piston in a normally retracted position,
   (e) means for simultaneously reversing said pistons whereby a predetermined amount of glass batch is measured,
   (f) means operatively associated with said member and responsive solely thereto, for providing a source of electrical energy to said glass batch feeding means when said sensing portion lowers to a predetermined level whereby the predetermined amount of glass batch is fed to said container to raise the level of said molten glass, and
   (g) external means for maintaining said sensing portion of said member at a temperature substantially below that of the molten glass.

2. An apparatus for controlling the level of molten material in a container comprising
   (a) a pivotally mounted float type level sensing member,
   (b) means for supporting the level sensing portion of said member above the surface of said molten material,
   (c) means comprising a timing device and a solenoid responsive thereto, for causing said sensing portion to lower toward said surface of said molten material at periodic intervals in accordance with a predetermined schedule,
   (d) raw material feeding means, and
   (e) means operatively associated with said member and responsive solely thereto for providing a source of electrical energy to said raw material feeding means when said sensing portion lowers to a predetermined level whereby a predetermined amount of raw material is fed by said feeding means to said container to raise the level of said molten material.

3. The apparatus of claim 2 wherein said means operatively associated with said member comprise an electrical switch.

4. The apparatus of claim 2 wherein said raw material feeding means comprise a vibratory hopper.

5. The apparatus of claim 2 further comprising external temperature controlling means for maintaining the temperature of said sensing portion of said member substantially below that of the molten material.

6. An apparatus for controlling the level of molten material in a container comprising
   (a) a float type level sensing member,
   (b) means for causing the level sensing portion of said member to lower toward the surface of said molten material at periodic intervals in accordance with a predetermined schedule,
   (c) raw material feeding means associated with and responsive to said sensing member comprising a batch chute and an escapement mechanism embodying a first solenoid with a normally extended piston disposed transverse the exit from said chute and a second solenoid having a piston normally retracted out of said chute, said second solenoid being disposed upward of said first solenoid along the path of said chute, and
   (d) means for simultaneously reversing said pistons whereby a predetermined amount of raw material is fed by said feeding means to said container to raise the level of said molten material.

7. An apparatus for controlling the level of molten material in a container comprising
   (a) a pivotally mounted float type level sensing member,
   (b) means for supporting the level sensing portion of said member above the surface of said molten material,
   (c) means comprising a timing device and a solenoid responsive thereto, for causing said sensing portion to lower toward said surface of said molten material at periodic intervals in accordance with a predetermined schedule,
   (d) a vibratory hopper for feeding a predetermined amount of raw material to said container,
   (e) means operatively associated with said member and responsive solely thereto for providing a source of electrical energy to said vibratory hopper when said sensing portion lowers to a predetermined level whereby said predetermined amount of raw material is fed to said container to raise the level of said molten material, and
   (f) a member for emitting a stream of air directed at the external surface of said sensing portion of said member.

8. An apparatus for controlling the level of molten material in a container comprising
   (a) a pivotally mounted float type level sensing member,
   (b) means for supporting the level sensing portion of said member above the surface of said molten material,
   (c) means comprising a timing device and a solenoid responsive thereto, for causing said sensing portion to lower toward said surface of said molten material at periodic intervals in accordance with a predetermined schedule,
   (d) a raw material feeding means comprising a batch chute and an escapement mechanism embodying a first solenoid with a normally extended piston disposed transverse the exit from said chute and a second solenoid having a piston normally retracted out of said chute, said second solenoid being disposed upward of said first solenoid along the path of said chute,
   (e) means for simultaneously reversing said pistons whereby a predetermined amount of raw material is measured,
   (f) means operatively associated with said member and responsive solely thereto for providing a source of electrical energy to said raw material feeding means when said sensing portion lowers to a predetermined level whereby said predetermined amount of raw material is fed to said container to raise the level of said molten material, and
   (g) external means for maintaining the temperature of said sensing portion of said member substantially below that of the molten material.

9. The apparatus of claim 8 wherein said means for maintaining the temperature comprise a member for emitting a stream of air directed at the external surface of said sensing portion of said member.

10. An apparatus for controlling the level of molten material in a container comprising
   (a) a float type level sensing member,
   (b) means for causing the level sensing portion of said member to lower toward the surface of said molten material at periodic intervals in accordance with a predetermined schedule,
   (c) raw material feeding means,
   (d) means operatively associated with said member and responsive solely thereto for providing a source of electrical energy to said raw material feeding means when said sensing portion lowers to a predetermined level whereby a predetermined amount of raw material is fed by said feeding means to said container to raise the level of said molten material.

References Cited

UNITED STATES PATENTS

| | | | |
|---|---|---|---|
| 1,783,806 | 12/1930 | Loebe et al. | 221—294 X |
| 2,343,549 | 3/1944 | Groghan | 65—160 X |
| 2,565,136 | 8/1951 | Kretzmer | 65—160 X |
| 2,568,332 | 9/1951 | Genovese | 18—12 |

FOREIGN PATENTS

| | | |
|---|---|---|
| 1,012,424 | 4/1952 | France. |

DONALL H. SYLVESTER, *Primary Examiner.*

A. D. KELLOGG, *Assistant Examiner.*